United States Patent Office 2,893,857
Patented July 7, 1959

2,893,857

AMINOLEAD COMPOUND AND HERBICIDAL COMPOSITION CONTAINING SAME

David O. De Pree, Royal Oak, Mich., assignor to Ethyl Corporation, New York, N.Y., a corporation of Delaware No Drawing. Application May 29, 1953
Serial No. 358,527

2 Claims. (Cl. 71—2.7)

The present invention relates to aminolead compounds, more particularly to such compounds that are hydrocarbyl substituted.

Among the objects of the present invention is the provision of novel aminolead compounds as well as novel compositions containing them.

The above as well as additional objects of the present invention will be more completely understood from the following description of several of its exemplifications.

It has been discovered that trihydrocarbyl-N-hydrocarbyl-aminoleads are fairly good antiknock agents and are suitable for antiknock use in gasolines. These compounds are readily made by reacting the corresponding trihydrocarbyllead halide with the sodium derivative of a primary or secondary amine. The resulting products are generally liquids that are readily miscible with gasoline in the proportions in which they are useful for antiknock purposes.

By way of example, triethyllead chloride dissolved in ten times its weight of benzene is mixed with a slight stoichiometric excess of the sodium derivative of sec-butylamine prepared in the manner described in copending application, Serial No. 279,452, filed March 29, 1952, and now abandoned. The mixture is stirred and refluxed for 30 minutes at atmospheric pressure. A white precipitate of sodium chloride forms and is filtered off, leaving a solution from which a pale yellow liquid is recovered by evaporating off volatile material on a steam bath.

The pale yellow liquid does not solidify at a temperature as low as $-50°$ C. and is fairly pure triethyl-N-sec-butylaminolead. A small amount of free amine can be distilled out of it by heating the liquid under a pressure of about 0.1 millimeter of mercury to about 60° C. This purification appears to have no significant effect on the properties of the liquid.

Upon standing at room temperature in contact with air and light, the triethyl-N-sec-butylaminolead decomposes gradually, slowly depositing metallic lead in finely divided form. In the presence of moisture the compound decomposes to form triethyllead hydroxide and sec-butylamine.

When sufficient amount of the pale yellow liquid is added to gasoline to make a mixture having 4.49 grams of lead per gallon, an octane number increase of about 6 is obtained.

The other trihydrocarbyl - N-hydrocarbylaminoleads have about the same order of activity. Examples of these compounds are triethyl-N-ethylaminolead; triethyl-N,N-dimethylaminolead; trimethyl-N-amylaminolead; diethyl-monomethyl-N-benzylaminolead; triisopropyl - N,N - di-phenylaminolead; triphenyl - N - octylaminolead; and tri-benzyl - N - methyl-N-cyclohexylaminolead. It appears that the desired activity is obtained with any type of hydrocarbyl radical substituted in the aminolead, except that one of the hydrogen atoms linked to the nitrogen need not be substituted. All of the above compounds are slowly decomposable liquids, some with very low freezing points, and appreciably soluble in gasoline as well as hydrocarbon solvents in general.

A feature of the compounds of the present invention is that they are very effective herbicides and are particularly useful for application to plants. They are readily mixed with volatile carriers, such as hydrocarbon fractions of petroleum, that distill over at temperatures below the kerosene distilling range. The trihydrocarbyl-N-hydrocarbylaminolead compound is present in the herbicidally active composition in an amount constituting at least about 0.1 percent by weight of the entire composition. Dispersing agents need not be used to prepare these mixtures in concentrations of up to about 2 precent of the aminolead compound by weight. However, non-ionic dispersing agents, such as polyethylene glycols having molecular weights of about 1200 or higher, can be used to assist in dispersing the compounds either in hydrocarbon or other solvents, including water, or in dispersing a hydrocarbon solution of the aminolead compound into water.

When applied to plants, the aminolead compounds of the present invention slowly decompose and are thereby converted by exposure to moisture into trihydrocarbyl-lead hydroxides. These hydroxides are solids of low solubility which cling very tenaciously to the surfaces on which they form and are not easily washed off. The herbicidal effect is quite powerful, apparently by reason of the high lead content of the hydroxides and the organic nature of the lead.

The compounds of the present invention can all be made by the above type of condensation or by reacting trihydrocarbyllead hydroxide with a primary or secondary amine under dehydrating condition, as by refluxing in the presence of a strong dehydrating agent. Either type of condensation can also be used to prepare corresponding silicon, tin, and arsenic compounds, in which the metals take the place of lead.

As many apparently widely different embodiments of this invention may be made without departing from the spirit and scope hereof, it is to be understood that the invention is not limited to the specific embodiment hereof, except as defined in the appended claims.

What is claimed is:
1. Triethyl-N-sec-butylaminolead.
2. A herbicidally active composition consisting essentially of at least about 0.1 percent by weight of triethyl-N-sec-butylaminolead, a liquid hydrocarbon carrier therefor, said hydrocarbon having a boiling range below the kerosene distillation range and as a non-ionic dispersing agent, a polyethylene glycol having a molecular weight of above 1200 in amount sufficient to assist in dispersing said triethyl-N-sec-butylaminolead.

References Cited in the file of this patent

UNITED STATES PATENTS

| | | |
|---|---|---|
| 2,134,625 | Shappirio | Oct. 25, 1938 |
| 2,453,138 | Kharasch | Nov. 9, 1948 |
| 2,595,798 | Ligett et al. | May 6, 1952 |